2,714,882

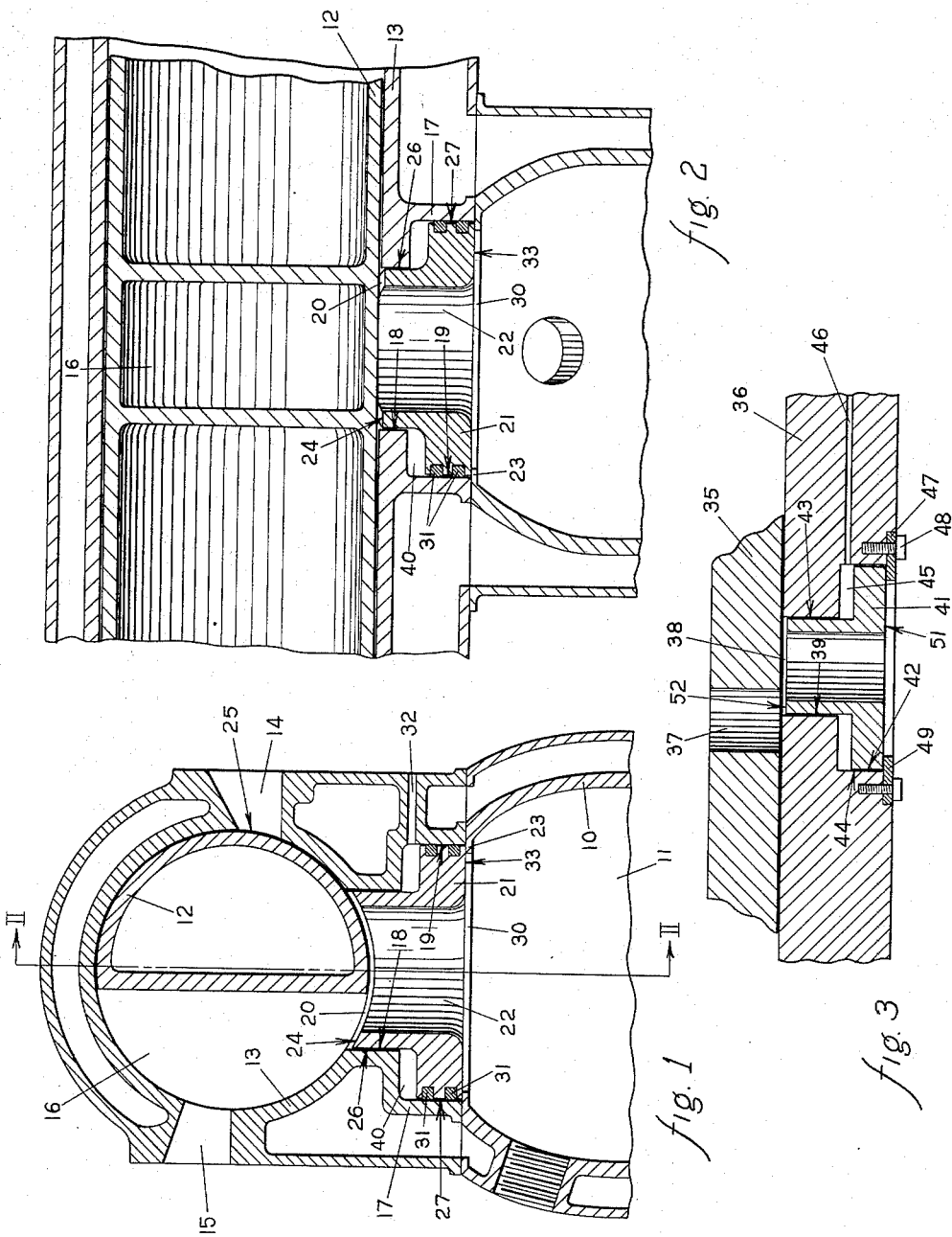
Aug. 9, 1955 — P. BREVARD — 2,714,882
SEAL FOR A SLIDE VALVE
Filed Dec. 19, 1949
Inventor
PROCTER BREVARD
By Lindley E. Mills United States Patent Office
2,714,882
Patented Aug. 9, 1955

SEAL FOR A SLIDE VALVE

Procter Brevard, Three Rivers, Mich.

Application December 19, 1949, Serial No. 133,698

4 Claims. (Cl. 123—190)

This invention relates to a seal for a valve, particularly to a seal for a slide valve adapted to control the flow of a fluid under pressure.

Many valves have been devised wherein one member slides in face-to-face contact with another member in such fashion that, during the sliding movement, ports in the two members are brought alternately into and out of register, the valve being thus opened and closed, respectively, by the movement of the one member with respect to the other member. Such valves are conventional in the art and may comprise either a flat-faced member sliding with a reciprocal or with a rotary motion in face-to-face contact with another flat-faced member, or a cylindrical member rotating in a close-fitting housing. Valves having members with non-cylindrical curved surfaces in face-to-face sliding contact have also been devised. Such a valve is herein referred to as a "slide valve," it being understood that the term refers to any valve wherein a pair of ports are brought into and out of register by the sliding of the surface of one member in contact with and with respect to the surface of another member. In actual practice one of the members is usually stationary as a matter of convenience, but this is not essential to the operation of the valve. The members whose surfaces are in face-to-face sliding contact are hereinafter referred to, for convenience, as "valve members." These are further, for purposes of convenient differentiation, sometimes referred to herein as a "stationary valve member" and a "sliding valve member," respectively, it being understood that the stationary valve member is only of necessity stationary with respect to certain of the other parts, as will hereinafter be apparent.

Slide valves have certain advantages for many applications over valves of other sorts. Slide valves are of particular value when rapid alternate opening and closing of the valve is required since they eliminate the rapid and forcible impact of one valve member against another. Rotary slide valves are of particular advantage in many instances because the rotating member can revolve or rotate at a uniform speed with the consequent avoidance of undue stresses, strains and vibration caused by the high speed movement of reciprocating parts.

Slide valves heretofore available have, however, suffered from the difficulty of maintaining a seal tight enough to prevent leakage through the valve. This is particularly true in instances where gases under high pressure are involved, such as in an internal combustion engine or in the liquefaction of a gas under high pressure. The sealing of a slide valve against leakage has generally depended upon the valve members being held tightly against one another. This is difficult to accomplish when the contacting surfaces are flat because of the high pressure required and the consequent rapid wear on the sealing surfaces. It is particularly difficult to accomplish in the case of a rotary valve because any wear of the rotating member or of the housing in which it rotates cannot generally be compensated for by adjustment without the use of highly complex and costly modifications. For this and other reasons slide valves have not been found satisfactory for use in internal combustion engines although rotary valves should offer many advantages over the conventional poppet type of valve in general use. It is apparent that an improved and satisfactory means for sealing a slide valve, particularly a rotary valve, against leakage would be of great value.

It is, therefore, an object of the present invention to provide a seal for a slide valve.

An additional object is to provide apparatus for sealing a slide valve against leakage when subjected to a gas under pressure.

An additional object is to provide apparatus for sealing a rotary valve.

An additional object is to provide apparatus whereby a slide valve communicating with a chamber adapted to contain a gas or other fluid under high pressure can be sealed against substantial leakage of fluid from the chamber through the valve during the period when the valve is closed.

An additional object is to provide apparatus for sealing a rotary valve on the power cylinder of an internal combustion engine against leakage of gas from the cylinder through the valve.

According to the present invention, these and related objects are accomplished readily by interposing between a chamber port in the wall of a chamber adapted to contain a fluid under pressure and a valve port in one of the valve members of a slide valve, e. g. in a stationary valve member, a more or less elongated housing, herein referred to as a "seal housing," which communicates at one end, i. e. at its "outer" end, with the valve port and at its opposite or "inner" end with the chamber port. The seal housing can conveniently be formed as an integral part either of the chamber wall or of the stationary valve member, or it can be formed as a separate member and secured in fluid-tight manner between the chamber wall and the stationary valve member in any convenient way. A longitudinally bored sealing member for conducting fluid between the valve and the chamber is also formed and positioned within the seal housing in such manner that its "outer" end, i. e. its end adjacent the valve, projects through the valve port in the stationary valve member and is adapted to contact the sliding surface of the other or sliding valve member, and so that its opposite or "inner" end is subjected to the prevailing pressure of the fluid in the chamber. The outer end surface of the sealing member is contoured to the same contour as the contour of the sliding surface of the sliding valve member to form a fluid-tight seal therewith when the two surfaces are in pressure contact with one another.

Sections of the external surface of the sealing member adjacent both its outer and its inner ends are each formed to provide outer and inner alignment bearing surfaces, respectively, each parallel with the longitudinal axis of the sealing member and each bearing on a corresponding bearing surface formed on an adjacent section of the internal surface of the seal housing to maintain longituidnal alignment of the sealing member and to form substantially fluid-tight outer and inner sealing regions, respectively, between the sealing member and the seal housing to prevent substantial leakage of fluid between the seal housing and the sealing member. It is apparent that the sealing member is thus free to move in the direction of its longitudinal axis without interfering with the sealing function of the iner and outer sealing regions. It is often desirable when gases under high pressure are involved, and to compensate for wear of the bearing surfaces, to provide auxiliary means, such as compression rings, to aid in preventing the passage or leakage of fluid through the sealing regions between the sealing member and the seal housing. This is especially true of the inner sealing region as will be apparent hereinafter. Retaining means of any convenient sort are also provided to retain the sealing member within the seal housing and to prevent more than a small longitudinal movement thereof.

The effectiveness of the seal between the outer end surface of the sealing member and the sliding surface of the sliding valve member is insured by forming the sealing member and the seal housing so that the "inner effective area" of the sealing member, i. e. its cross-sectional area normal to its longitudinal axis which is encircled by and defined by the inner sealing region and which is subject to the prevailing pressure of the fluid within the chamber, is greater than its "outer effective area" i. e. its cross-sectional area normal to its longitudinal axis encircled by and defined by the outer sealing region and which is subject to back pressure of any fluid which may leak between the outer end surface and the sliding surface of the sliding valve member, e. g. during and immediately following a period of very low or negative pressure within the chamber. The difference between the inner effective area and the outer effective area may, for convenience, be referred to as the "net effective area" of the sealing member.

To prevent the development of back pressure on the net effective area of the sealing member which would result from leakage of fluid through the inner and outer sealing regions, particularly the former, an annular cavity, herein referred to as a "vent cavity," is formed intermediate the outer and inner sealing regions between the internal wall of the seal housing and the external wall of the sealing member and this cavity is vented to the atmosphere or to any other region of suitable low pressure. The development of back pressure on the net effective area is thus avoided and there is at all times a positive pressure on the inner end of the sealing member tending to force it into pressure contact with the sliding valve member which is at least equal to the pressure of the fluid on the net effective area of the sealing member. When this pressure reaches a moderate value, little, if any, back pressure develops on the outer effective area and the pressure tending to force the sealing member into contact with the sliding valve member then approaches, and is generally substantially equal to, the pressure of the fluid on the entire inner effective area.

It should also be mentioned that when the pressure in the fluid chamber is low, e. g. during the intake stroke of an internal combustion engine, there may be very little pressure or even a slight vacuum on the fluid chamber and this pressure may be less than the pressure in the vent cavity. Under such conditions the sealing member may exert very little pressure on the sliding valve member and may even be pulled out of contact with it to an extent depending upon the limit of its travel permitted by the retaining means, mentioned previously and which, in practice, is generally limited to a few thousandths of an inch. This condition is not ordinarily disadvantageous as leakage through the slide valve would be nonexistent or at a minimum during such periods. The condition can, however, be overcome, if desired, by evacuating the vent cavity to maintain at all times therein a pressure lower by a suitable amount than the pressure in the fluid chamber.

The invention can be better understood from the accompanying drawing wherein, in the interest of clarity, certain features are shown on a somewhat exaggerated scale and wherein:

Figure 1 is a fragmentary sectional elevation of an internal combustion engine having a rotary slide valve and embodying one modification of the invention, Figure 2 is a sectional elevation taken along the line II—II of Figure 1, and Figure 3 is a fragmentary sectional elevation of a sliding valve having flat, sliding surfaces and showing another modification of the invention.

Referring to Figures 1 and 2 there is shown a portion of a combustion cylinder 11 of an internal combustion engine having a conventional rotary valve comprising a rotating valve member 12 adapted to rotate in a valve housing 13 which contains an exhaust port 14, an inlet port 15 and a valve port 20 in communication, as hereinafter explained, with a chamber port 30 in the combustion chamber. A channel 16 is formed in the rotating member 12 to permit the passage of gas between the combustion cylinder 11 and one or the other of the ports 14 and 15, depending upon the position of the rotating member 12.

The portion of the valve housing 13 adjacent the combustion cylinder 11 is elongated somewhat to form a stepped tubular seal housing 17 extending between the valve and the cylinder. The seal housing 17 is formed with bearing surfaces 18 and 19 on its internal surface adjacent its outer and inner ends, respectively. The bearing surfaces 18 and 19 are parallel with one another and with the longitudinal axis of the seal housing 17. The diameter of the outer bearing surface 18 is smaller than the diameter of the inner bearing surface 19. Thus, the area of the opening in the outer end of the seal housing 17 defined by the bearing surface 18 is smaller than the opening in its inner end defined by the bearing surface 19. The seal housing 17 is secured at its inner end in any convenient way, e. g. by bolts, not shown, to the combustion cylinder wall 10, the seal housing furnishing a gas-tight conduit, except as hereinafter noted, communicating at its outer end with the port 20 in the stationary valve member or housing 13 and at its inner end with the combustion chamber 11 by way of the chamber port 30.

A sealing member 21, which is suitably bored longitudinally to provide a passage 22 for conducting a fluid between the cylinder and the rotary valve, is positioned within the seal housing 17 and is retained therein in any suitable manner, as by a shoulder 23 formed on the combustion chamber wall around the chamber port 30 against which the inner end of the sealing member 21 abuts loosely. The outer end surface 24 of the sealing member 21 is contoured to fit closely the sliding surface 25 of the rotating valve member 12. The sealing member 21 also has bearing surfaces 26 and 27 formed on its external surface adjacent its outer and inner ends, respectively, adapted to bear in substantially gas-tight relationship on the bearing surfaces 18 and 19, respectively, formed on the internal surface of the seal housing 17 to form outer and inner sealing regions, respectively, to keep to a minimum the amount of gas entering between the sealing member 21 and the seal housing 17. If desired, channels fitted with compression rings 31 can be positioned in the inner sealing region, e. g. in the bearing surface 27, to assist in providing as nearly a gas-tight inner sealing region as possible. Similar means can also be provided, if desired, in the outer sealing region, but are not generally necessary.

The external surface of the sealing member 21 and the internal surface of the seal housing 17 between the sealing regions defined by the surfaces 18 and 26 and by the surfaces 19 and 27, respectively, are formed so that they do not contact one another in fluid-tight relationship and thus define an annular vent cavity 40 around the sealing member 21 into which any fluid which does leak through the inner and outer sealing regions passes. The vent cavity 40, which can be of any desired shape or size, is vented, e. g. by way of a vent tube 32, to the atmosphere or to any other convenient region of suitable low pressure.

In the modification shown in Figure 3, the slide valve comprises valve members 35 and 36 which are in face-to-face sliding contact with one another. It will be apparent as the description proceeds that either of the members 35 or 36 can be a sliding member with the other member stationary or that, if desired, both members can be movable, the net result of such movement being a sliding of one member with respect to the other. When the valve is open, the port 37 in the member 35 is in register with the port 38 in the member 36, the reverse being true when the valve is closed. One of the members 36 has a passageway through it which serves as a seal housing for a longitudinally bored sealing member 41 positioned therein. The seal housing is formed so that its outer end, i. e. its end adjacent the other valve member 35, is smaller in diameter than its other or inner end which communicates with a chamber (not shown) adapted to contain a gas or other fluid under pressure.

Bearing surfaces 39 and 42 are formed on the internal wall surface of the seal housing adjacent its outer and inner ends, respectively, parallel with the longitudinal axis of the sealing member 41. Bearing surfaces 43 and 44 are formed on the external wall surface of the sealing member 41 and adjacent the ends thereof so as to bear on and cooperate with the bearing surfaces 39 and 42, respectively, to provide substantially gas-tight outer and inner sealing regions between the two members. The sections of the internal wall of the seal housing and of the external wall of the sealing member 41 lying between the sealing regions are formed so as to leave an annular vent cavity 45 wherein the two surfaces are separated from one another and into which fluid which leaks through the inner or outer sealing regions can pass. The vent cavity 45 is vented to the atmosphere or other region of suitable low pressure, e. g. by means of a vent 46 formed in the valve member 36.

A flat, annular retaining member 47 is recessed into the valve member 36 and secured, e. g. by bolts 48, in such a manner that an annular section 49 thereof overlaps somewhat the inner end of the sealing member and effectively retains it within the seal housing. The outer end surface 52 of the sealing member 41 is contoured in a plane to form a flat face-to-face sealing contact with the flat surface of the valve member 35.

When the valve is in a closed position, the pressure of the fluid in the chamber on the inner end surface 51 of the sealing member 41 forces the latter against the sliding surface of the valve member 35 by a pressure at least equal to, and generally greater than, the total pressure of the fluid on the part of the area of the inner end surface 51 of the member 41 which is in excess of the area of its outer end surface 52, thus effectively sealing the valve when in a closed position against leakage of fluid from the chamber through the valve.

It should be mentioned that, although the invention has been described with respect to a sealing member of circular cross-section, sealing members of any suitable non-circular cross-section are also contemplated and can be employed, of desired, the inner wall of the seal housing being non-circular to correspond with the outer wall surface of the sealing member within the inner and outer sealing regions.

It is, of course, apparent that the sealing device of the invention can be constructed so that the net effective area of the sealing member is of any suitable magnitude. In practice, the device is generally constructed with a net effective area which is dependent somewhat upon the area of contact of the sealing member with the sliding valve member and upon the range of pressures prevailing within the fluid chamber. It is also apparent that the sealing member can be constructed of any convenient length and that the outer and inner sealing regions and the vent cavity can be of any convenient dimensions provided the function of each, as herein described, is maintained. The magnitude of the longitudinal travel of the sealing member is generally kept as small as consistent with good engineering practice to avoid undue noise and wear within the sealing region. Shims can be provided, if desired, which can be removed or inserted, e. g. between the seal housing 17 and the retaining member 23 of Figure 1, to define the limit of travel of the sealing member and to compensate for wear of the outer end surface 24 thereof.

The term "fluid chamber" as used herein is understood to refer to a chamber of any sort and of any dimensions which is adapted to contain a fluid. Thus, it may refer to a storage or working vessel for containing a compressed gas or liquid under pressure, to a combustion cylinder of an internal combustion engine as illustrated in the drawing, or to a conduit adapted to conduct a fluid between the slide valve and a location remote therefrom. It is, of course, apparent that the pressures of the fluid within the fluid chamber and of the fluid within the longitudinal bore of the sealing member are at all times the same. It should be mentioned, furthermore, that although the invention has been described with particular respect to a seal for a slide valve which is in communication with a fluid chamber in which the fluid is normally under pressure and the vent cavity is under a pressure lower than that in the fluid chamber, the seal can, with proper modification, be used in instances wherein the vent cavity is under a pressure higher than that in the fluid chamber, e. g. when the fluid chamber is under high vacuum. For such use the seal is constructed so that the outer effective area is larger than the inner effective area and the vent cavity is vented to a region of pressure higher than that prevailing in the fluid chamber, the sealing member thus being forced into contact with the surface of the sliding valve member by a force which is a function of the excess of the pressure in the vent cavity over the pressure in the fluid chamber.

I claim:

1. In a seal for a slide valve, the combination including: a longitudinally bored sealing member adapted to conduct a fluid therethrough and having its outer end contoured and adapted when under pressure to contact in fluid-tight relationship the sliding surface of a sliding valve member; an outer sealing region encircling and defining an outer effective area of the sealing member subject, when the sealing member and the sliding surface are not in pressure contact with one another, to substantially the same pressure as the fluid conducted by the sealing member; an inner sealing region encircling and defining an inner effective area of the sealing member greater than the outer effective area and subject at all times to substantially the same pressure as the fluid conducted by the sealing member; and means to maintain the pressure on the external surface of the sealing member between the sealing regions, during the time pressure contact of the sealing member with the sliding surface is desired, less than the pressure of the fluid within the sealing member.

2. In a seal for a slide valve, the combination including: a longitudinally bored sealing member adapted to conduct a fluid between a slide valve and a fluid chamber and having its outer end adapted when under pressure to contact in fluid-tight relationship the sliding surface of a sliding valve member; a sealing region encircling and defining an outer effective area of the sealing member subject to back pressure on occasions when fluid passes between the outer end of the sealing member and the sliding surface; a sealing region encircling and defining an inner effective area of the sealing member greater than the outer effective area and subject to the pressure of a fluid within the fluid chamber; and means to vent fluid passing through the outer and inner sealing regions to a region wherein the pressure is lower than in the fluid chamber.

3. In a seal for a slide valve comprising a pair of valve members in face-to-face sliding contact with one another and in communication with a chamber adapted to contain a fluid under pressure, the combination including: a seal housing interposed between the valve and the chamber communicating at its outer end with a valve port in one of the valve members and at its inner end with a chamber port in the wall of the chamber; a longitudinally bored sealing member within the seal housing adapted to convey a fluid between the valve and the chamber having its outer end adapted to project through the valve port to contact the sliding surface of the other valve member and having its outer end surface contoured to the same contour as the sliding surface of the said other valve member; bearing surfaces on the external wall of the sealing member and on the internal wall of the seal housing adjacent the outer ends thereof and parallel with the longitudinal axis of the sealing member cooperating in substantially gas-tight relationship to form an outer sealing region and defining an outer effective area of the sealing member; bearing surfaces on the external wall of the sealing member and on the internal wall of the seal housing adjacent the inner ends thereof and parallel with the longitudinal axis of the sealing member cooperating in substantially gas-tight relationship to form an inner sealing region defining an inner effective area of the sealing member greater than the outer effective area; a vent cavity between the sealing member and the seal housing intermediate the outer and inner sealing areas; means to vent the vent cavity to a region of suitable low pressure; and means to retain the sealing member within the seal housing.

4. In an internal combustion engine, the combination including: a combustion cylinder having a cylinder port therein; a rotary slide valve having a valve housing, a rotating valve member in sliding face-to-face contact with the housing and a valve port in the housing thereof; a longitudinally bored seal housing extending between and in communication with the cylinder port and the valve port; a sealing member retained within the seal housing by a retaining means, the outer end surface of the sealing member being contoured to the contour of the surface of the rotating valve member and adapted to contact the latter in gas-tight relationship when under pressure; bearing surfaces on the facing walls of the seal housing and the sealing member forming a substantially gas-tight outer sealing region encircling and defining an outer effective area of the sealing member adjacent its outer end; bearing surfaces on the facing walls of the seal housing and the sealing member forming a substantially gas-tight inner sealing region encircling and defining an inner effective area of the sealing member adjacent its inner end greater than the outer effective area; and means to vent to the atmosphere any gas passing through the inner and outer sealing region.

References Cited in the file of this patent

UNITED STATES PATENTS

| | | |
|---|---|---|
| 572,297 | Hennebohle | Dec. 1, 1896 |
| 1,057,297 | Tartrais | Mar. 25, 1913 |
| 1,131,776 | Ewert | Mar. 16, 1915 |
| 1,156,663 | Calkins | Oct. 12, 1915 |
| 1,180,346 | Wales | Apr. 25, 1916 |
| 1,189,757 | Wales | July 4, 1916 |
| 1,242,460 | McClintock | Oct. 9, 1917 |
| 1,252,753 | Wehr | Jan. 8, 1918 |
| 1,841,344 | Baer | Jan. 12, 1932 |
| 1,977,025 | Vander Elst et al. | Oct. 16, 1934 |
| 2,156,960 | Baer | May 2, 1939 |

FOREIGN PATENTS

| | | |
|---|---|---|
| 17,901 | Great Britain | Aug. 3, 1909 |
| 530,687 | Germany | 1931 |